US008047774B2

(12) United States Patent
Bagepalli

(10) Patent No.: US 8,047,774 B2
(45) Date of Patent: Nov. 1, 2011

(54) SYSTEM FOR HEATING AND COOLING WIND TURBINE COMPONENTS

(75) Inventor: Bharat S. Bagepalli, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 631 days.

(21) Appl. No.: 12/208,495

(22) Filed: Sep. 11, 2008

(65) Prior Publication Data

US 2010/0061853 A1 Mar. 11, 2010

(51) Int. Cl.
*F01D 5/08* (2006.01)

(52) U.S. Cl. ............ 415/176; 415/178; 310/58; 310/64; 165/100; 165/103

(58) Field of Classification Search .......... 415/175–178; 310/58–64, 60 A, 60 R; 290/44, 55; 165/58, 165/59, 61, 100, 101, 103
See application file for complete search history.

(56) References Cited

U.S. PATENT DOCUMENTS

| | | | | |
|---|---|---|---|---|
| 6,676,122 | B1 | 1/2004 | Wobben | |
| 7,057,305 | B2 | 6/2006 | Kruger-Gotzmann et al. | |
| 7,154,191 | B2 | 12/2006 | Jansen et al. | |
| 7,154,192 | B2 | 12/2006 | Jansen et al. | |
| 7,161,260 | B2 | 1/2007 | Kruger-Gotzmann et al. | |
| 7,168,251 | B1 | 1/2007 | Janssen | |
| 7,365,447 | B2 * | 4/2008 | Yoshida | 290/55 |
| 2001/0035651 | A1 | 11/2001 | Umemoto et al. | |
| 2004/0041408 | A1 | 3/2004 | Casazza | |
| 2005/0167989 | A1 | 8/2005 | Kruger-Gotzmann et al. | |
| 2007/0222223 | A1 | 9/2007 | Bagepalli et al. | |

FOREIGN PATENT DOCUMENTS

| | | | |
|---|---|---|---|
| DE | 842330 | C | 6/1952 |
| DE | 0514119 | A1 | 11/1992 |
| DE | 102007042338 | A1 | 12/2009 |
| EP | 1508692 | A1 | 2/2005 |
| EP | 1586769 | A2 | 10/2005 |
| EP | 1837519 | A2 | 9/2007 |
| EP | 1978247 | A2 | 10/2008 |
| FI | 96134 | B | 1/1996 |
| JP | 2009309122 | A | 12/2008 |
| JP | 2009185641 | A | 8/2009 |
| WO | 2007136765 | A2 | 11/2007 |
| WO | 2008092449 | A2 | 8/2008 |
| WO | 2008142947 | A1 | 11/2008 |
| WO | WO 2008131766 | A2 * | 11/2008 |

* cited by examiner

*Primary Examiner* — Charles Garber
*Assistant Examiner* — Bryan Junge
(74) *Attorney, Agent, or Firm* — James W. Pemrick; Ernest G. Cusick; Frank A. Landgraff

(57) ABSTRACT

A heating and cooling system for a wind turbine is provided and includes a gearbox, gearbox heat exchanger, generator, generator heat exchanger, and a cooling duct. The cooling duct is connected to the gearbox and generator heat exchangers, and is used to transport air across both heat exchangers to cool the gearbox and generator.

9 Claims, 3 Drawing Sheets

305 310 315 222 212 320 106 110 240 330 340 102

SYSTEM FOR HEATING AND COOLING WIND TURBINE COMPONENTS

BACKGROUND OF THE INVENTION

This invention relates generally to wind turbines and more particularly, to a system for heating and cooling wind turbine components.

Generally, a wind turbine includes a rotor having multiple blades. The blades are attached to a rotatable hub, and the blades and hub are often called the rotor. The rotor transforms mechanical wind energy into a mechanical rotational torque that drives one or more generators. The generators are generally, but not always, rotationally coupled to the rotor through a gearbox. The gearbox steps up the inherently low rotational speed of the turbine rotor for the generator to efficiently convert the rotational mechanical energy to electrical energy, which is fed into a utility grid. Gearless direct drive wind turbine generators also exist. The rotor, generator, gearbox and other components are typically mounted within a housing, or nacelle, that is positioned on top of a base that may be a truss or tubular tower.

The gearboxes need to be lubricated and cooled to function effectively. Typically, oils are used for lubrication in a gearbox, and the oil heats up during operation of the gearbox. A heat exchanger is typically used to cool the oil, and an oil-to-air radiator or heat exchanger is commonly used to dissipate heat from the lubricating oil. Electrical generators also need to be cooled and air-to-air or water-to-air heat exchangers have been employed to dissipate the heat from the generators housed within the nacelle.

In some known systems, the gearbox and generator have their own separate heat exchangers. For example, in one known system a gearbox heat exchanger includes a fan, ductwork, and an oil-to-air heat exchanger. The generator heat exchanger includes another fan, additional ductwork and an air-to-air heat exchanger. Air for both separate heat exchangers is typically drawn from the air within the nacelle. During operation of the wind turbine, many components generate heat and the temperature of the air within the nacelle can be elevated with respect to the outside ambient air. This can result in in-efficiencies in the cooling system by using warmed air to cool hot components.

BRIEF DESCRIPTION OF THE INVENTION

In one aspect of the present invention, a heating and cooling system for a wind turbine is provided and includes a gearbox, gearbox heat exchanger, generator, generator heat exchanger, and a cooling duct. The cooling duct is connected to the gearbox and generator heat exchangers, and is used to transport air across both heat exchangers to cool the gearbox and generator.

DETAILED DESCRIPTION OF THE INVENTION

Figure 1:
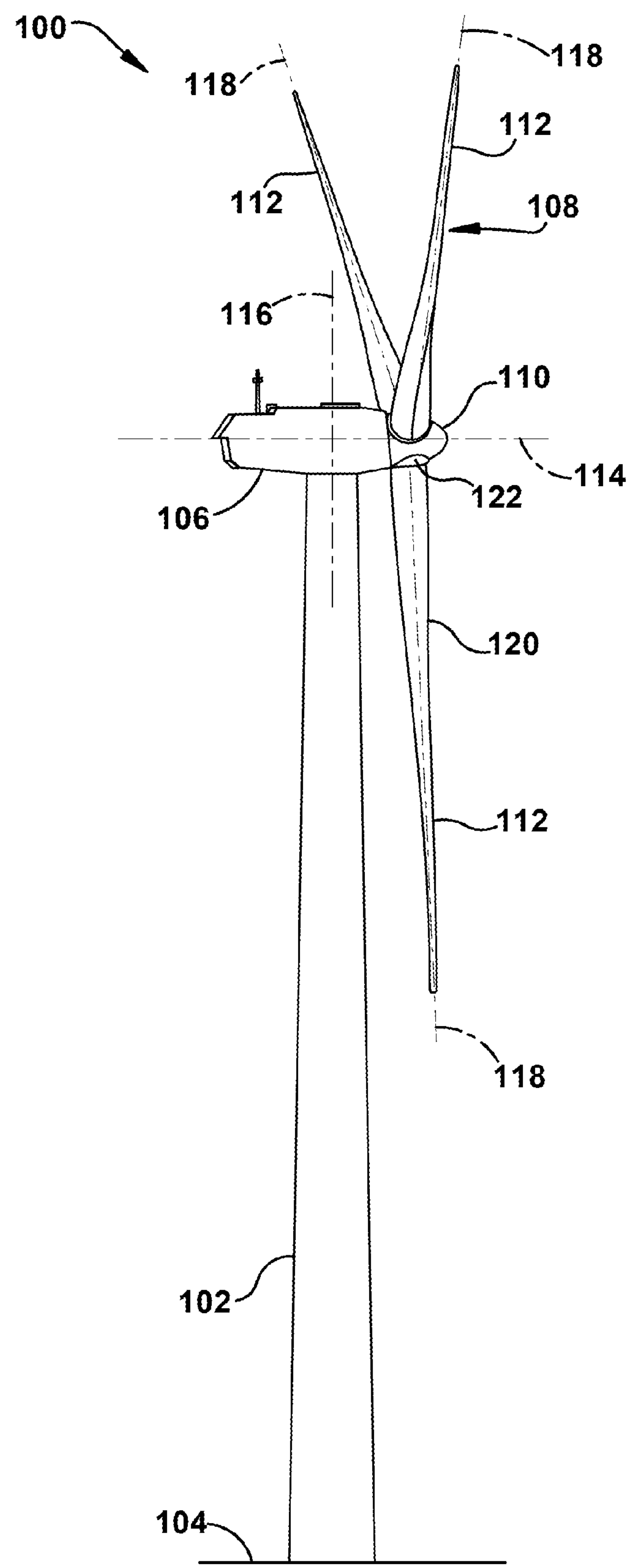
FIG. 1 is a schematic illustration of an exemplary wind turbine generator.

FIG. 1 is a schematic illustration of an exemplary wind turbine 100. In the exemplary embodiment, wind turbine 100 is a horizontal axis wind turbine. Alternatively, wind turbine 100 may be a vertical axis wind turbine. Wind turbine 100 has a tower 102 extending from a supporting surface 104, a nacelle 106 mounted on tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. In an alternative embodiment, rotor 108 may have more or less than three rotor blades 112. In the exemplary embodiment, tower 102 is fabricated from tubular steel and has a cavity (not shown in FIG. 1) extending between supporting surface 104 and nacelle 106. In an alternate embodiment, tower 102 is a lattice tower. The height of tower 102 is selected based upon factors and conditions known in the art.

Blades 112 are positioned about rotor hub 110 to facilitate rotating rotor 108 to transfer kinetic energy from the wind into usable mechanical energy, and subsequently, into electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

In the exemplary embodiment, blades 112 have a length between about 50 meters (m) (164 feet (ft)) and about 100 m (328 ft). Alternatively, blades 112 may have any length. As the wind strikes blades 112, rotor 108 is rotated about rotation axis 114. As blades 112 are rotated and subjected to centrifugal forces, blades 112 are subjected to various bending moments and other operational stresses. As such, blades 112 may deflect and/or rotate from a neutral, or non-deflected, position to a deflected position and associated stresses, or loads, may be induced in blades 112. Moreover, a pitch angle of blades 112, i.e., the angle that determines blades 112 perspective with respect to the direction of the wind, may be changed by a pitch adjustment mechanism (not shown in FIG. 1) to facilitate increasing or decreasing blade 112 speed by adjusting the surface area of blades 112 exposed to the wind force vectors. Pitch axes 118 for blades 112 are illustrated. In the exemplary embodiment, the pitches of blades 112 are controlled individually. Alternatively, the pitches of blades 112 may be controlled as a group.

In some configurations, one or more microcontrollers in a control system (not shown in FIG. 1) are used for overall system monitoring and control including pitch and rotor speed regulation, yaw drive and yaw brake application, and fault monitoring. Alternatively, distributed or centralized control architectures are used in alternate embodiments of wind turbine 100.

Figure 2:
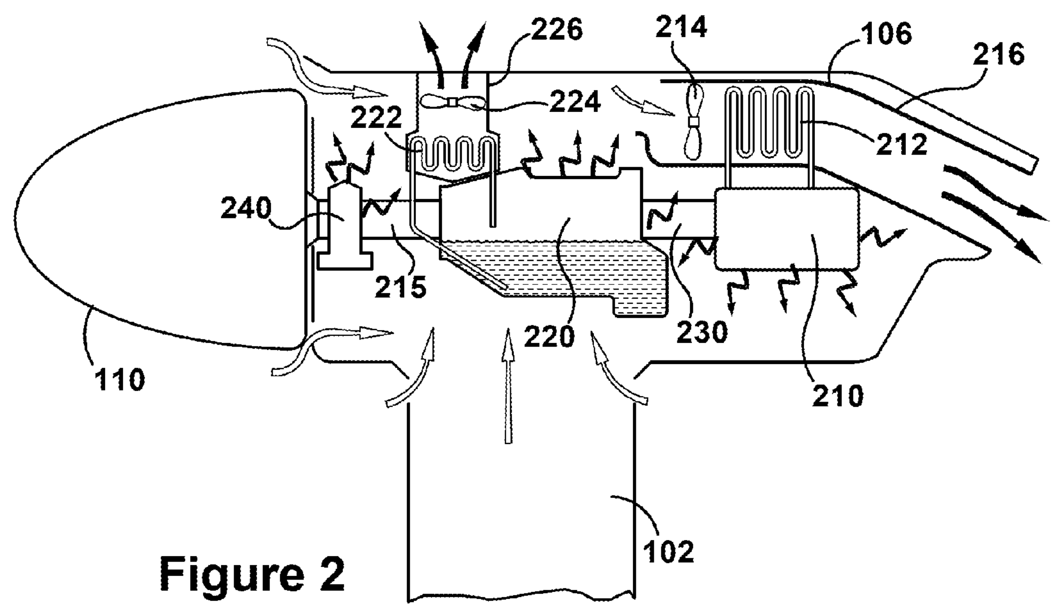
FIG. 2 is a fragmentary cross-sectional schematic illustration of a nacelle that may be used with the exemplary wind turbine generator shown in FIG. 1.

FIG. 2 is a simplified cross-sectional schematic illustration of one known wind turbine incorporating separate heat exchangers to cool the gearbox and generator. Various components of wind turbine 100 are housed in nacelle 106 atop tower 102 of wind turbine 100. Rotor 108 is rotatably coupled to an electric generator 210 positioned within nacelle 106 via rotor shaft 215 (sometimes referred to as a low speed shaft), a gearbox 220, a high-speed shaft 230, and one or more couplings (not shown). One or more support bearings 240 (only one shown), are positioned within and are supported by nacelle 106. Bearing 240 facilitates radial support and alignment of shaft 215. The rotation of shaft 215 rotatably drives gearbox 220 that subsequently drives shaft 230. The high-speed shaft 230 drives generator 210, which is used for the production of electrical power.

The gearbox 220, generator 210 and bearing 240 generate heat during operation, and some of these components may need to be cooled to avoid overheating. The "Z" shaped arrows illustrate heat dissipation in FIG. 2. In one known system, the gearbox 220 incorporates a gearbox cooling system having a gearbox heat exchanger 222, gearbox fan 224 and ductwork 226. Many gearboxes use oil as a lubricating and heat transfer medium, and this oil is pumped through heat exchanger 222 to be cooled by air drawn from within nacelle 106. The heated air is then usually discharged out from the top of the nacelle 106.

The generator 210 also generates a lot of heat and, as in the above known system, incorporates a generator cooling system having a generator heat exchanger 212, generator fan 214 and ductwork 216. Many generators use water as a heat transfer medium, and this water is pumped through heat exchanger 212 to be cooled by air drawn from within nacelle 106. The heated air is then usually discharged out from the back of the nacelle 106. Some generators may also use air-to-air heat exchangers or water-to-air heat exchangers. The water used may be mixed with anti-freeze or alternatively, other suitable cooling liquids could be used.

In this one known system, air is drawn into both heat exchangers from within the nacelle 106. This air can be undesirably warmed by various components in the nacelle that generate heat. For example, bearing 240, gearbox 220, generator 210 and other components can generate heat, which can warm the air drawn into the nacelle. Heat exchangers work more efficiently with larger temperature gradients, and it would be beneficial to use the lowest possible temperature input air.

Figure 3:
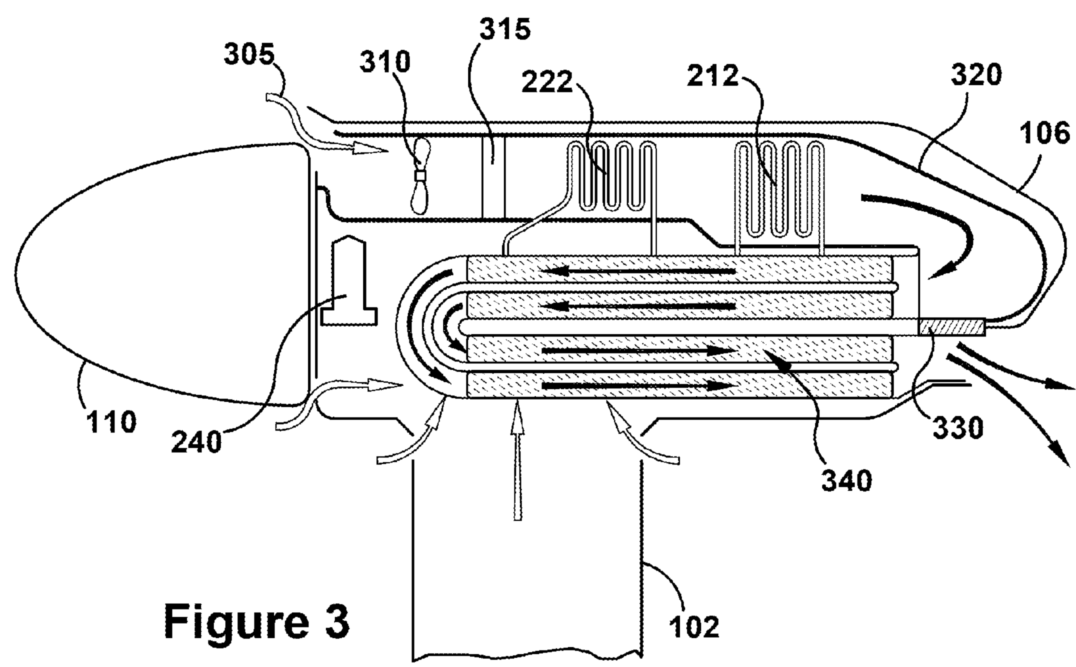
FIG. 3 is a fragmentary cross-sectional schematic illustration of a nacelle according to one embodiment of the present invention that may be used with the exemplary wind turbine generator shown in FIG. 1.

FIG. 3 shows an improved cooling and heating system according to one aspect of the present invention. The intake air for the heat exchangers is taken directly from outside of nacelle 106, via one or more vents or ports located near the front of the nacelle. In alternative embodiments intake air could be ducted from other parts of the wind turbine, including but not limited to the rotor, hub, tower or inside the nacelle.

Intake air, represented by arrow 305, passes through a single fan 310 and filter 315. The filter 315 could be placed before or after the fan 310. The ductwork 320 directs the incoming, filtered air past the gearbox heat exchanger 222 and the generator heat exchanger 212. Some advantages to this configuration are that cool, external air is drawn into the cooling system, and a single fan can service multiple heat exchangers.

In addition, a bypass door 330 can be added to the system to optimize the cooling and heating system for warm or cold weather operation. The bypass door could also be comprised of a valve, gate, louvers or other suitable device. A nacelle warming radiator 340 can be added to the interior of the nacelle to heat the nacelle during cold weather operation. When bypass door 330 is in the horizontal position (as shown in FIG. 3) air passing through ductwork 320 is diverted to pass through nacelle warming radiator 340. The heat absorbed by the air, as it passed by the gearbox and generator heat exchangers, can be extracted by the nacelle warming radiator 340 and used to heat the interior of the nacelle 106.

In cold weather operation (e.g., colder than about 0° C.) it may be advantageous to keep the interior of the nacelle above a predetermined temperature. Various sub-systems and electronics in the nacelle may need to be kept from extreme cold temperatures. Service personnel will also benefit from a warmer work environment when external temperatures are cold. For example, if the external, ambient temperature was below about −10° C., a service technician would find it very difficult and uncomfortable to work within nacelle 106. By implementing the heating and cooling system of the present invention, the nacelle interior temperature can be maintained at elevated temperatures with respect to the external, ambient temperature, and therefore service personnel can perform their duties more comfortably and in less time.

Figure 4:
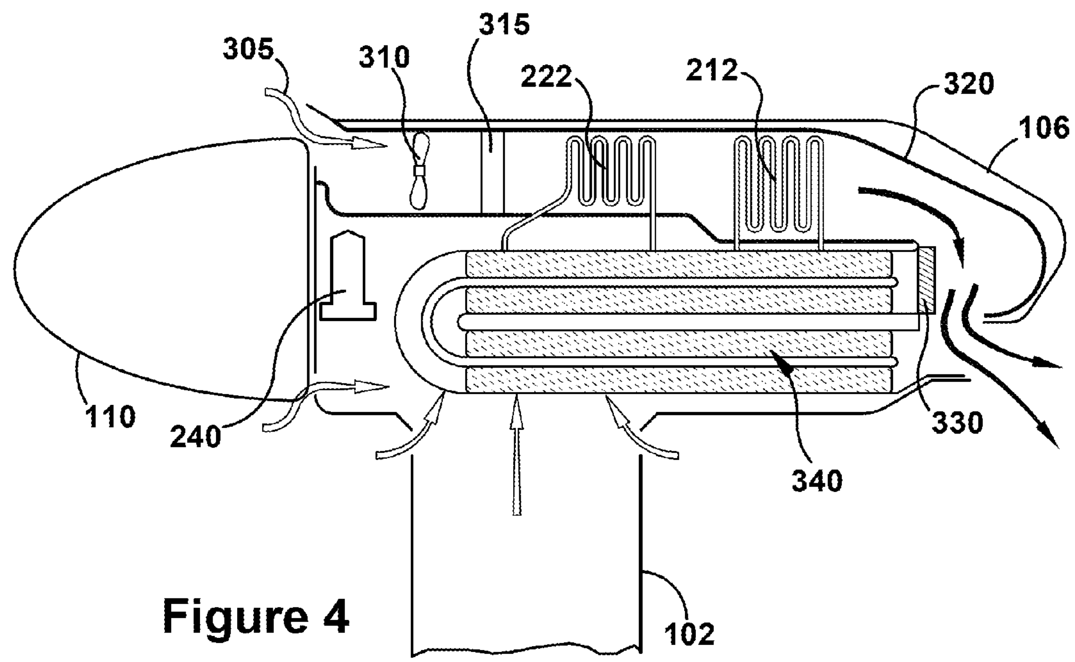
FIG. 4 is a fragmentary cross-sectional schematic illustration of a nacelle according to one embodiment of the present invention that may be used with the exemplary wind turbine generator shown in FIG. 1.

FIG. 4 illustrates the heating and cooling system configured for warm weather operation. Bypass door 330 is shown in the vertical position, and this position blocks air from entering the nacelle warming radiator 340. The air is directed down and out the rear of the nacelle. Bypass door could be implemented by a single hinged door or two sets of louvered vents or valves. Other suitable means for allowing air to pass and to prevent air from passing through ductwork could also be employed.

The nacelle warming radiator can comprise one or more tubes or ducts with heat radiating capability or heat radiating fins or projections. The interior of the ducts can be designed to maximize the heat transfer of air passing through by incorporating baffles, fins, interior projections or any other suitable means to increase the surface area of the interior of the ducts. Air exiting the nacelle warning radiator can be exhausted from the rear or other parts of nacelle 106.

Figure 5:
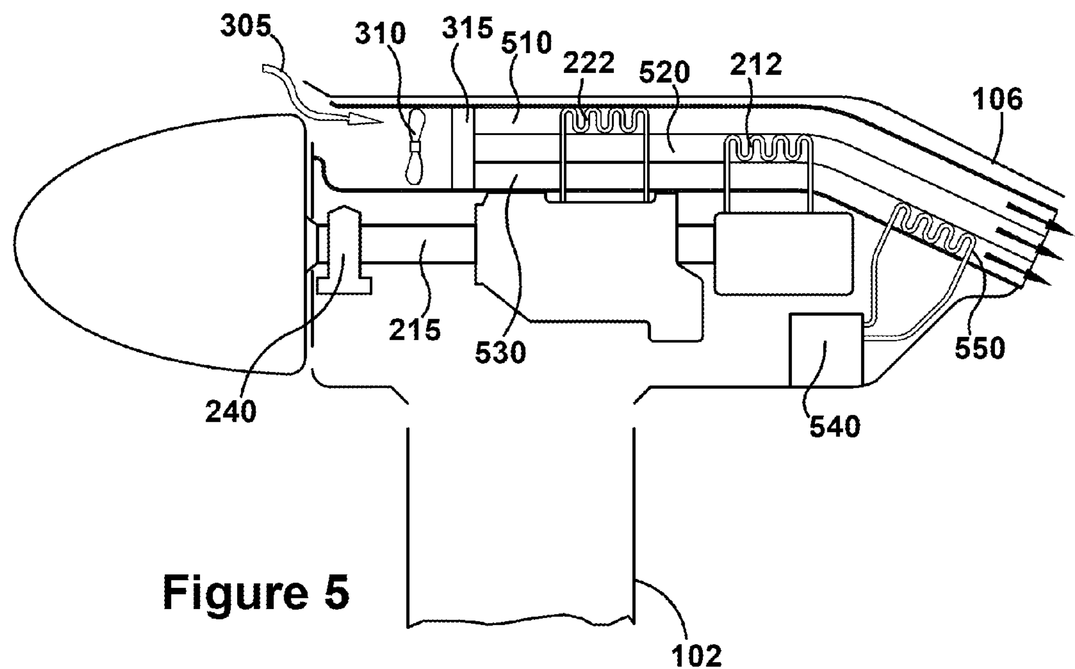
FIG. 5 is a fragmentary cross-sectional schematic illustration of a nacelle according to another embodiment of the present invention that may be used with the exemplary wind turbine generator shown in FIG. 1.

FIG. 5 illustrates another embodiment of the present invention, and incorporates multiple duct sections servicing individual components. As in previously described embodiments, a single fan 310 and filter 315 are employed. However, multiple fans and/or filters could be used if desired. A first duct section 510 is connected to the gearbox heat exchanger 222. A second duct section 520 is connected to the generator heat exchanger 212. A third duct section 530 can be connected to a control panel 540 heat exchanger 550. It is also to be understood that other components or subsystems of the wind turbine could also be heated or cooled via the third duct section or other duct sections.

A portion of the turbine control system resides within control panel 540 (also referred to as the "top box"). The control panel 540 contains electronics used to control and monitor environmental conditions, and the various systems and components of wind turbine 100. These electronics can generate a lot of heat, and may need to be cooled. The control panel heat exchanger 550 can help to maintain the desired temperature of the electronics within the control panel 540.

One advantage to having individual ducts servicing each heat exchanger is that the coolest possible air is directed to each heat exchanger. For example, external air 305 is drawn into the cooling and heating system and is applied to each heat exchanger without being warmed be previous heat exchangers. The nacelle warming radiator 340 and bypass door 330 (both not shown in FIG. 5), are omitted for clarity but could be used with the embodiment illustrated in FIG. 5.

While the invention has been described in terms of various specific embodiments, those skilled in the art will recognize that the invention can be practiced with modification within the spirit and scope of the claims.

What is claimed is:

1. A heating and cooling system comprising:

a gearbox and gearbox heat exchanger;

a generator and generator heat exchanger;

a cooling duct connected to said gearbox heat exchanger and said generator heat exchanger;

wherein, said cooling duct is used to transport air across said gearbox heat exchanger and said generator heat exchanger to cool said gearbox and said generator, and wherein the heating and cooling system is used with a wind turbine, the heating and cooling system further comprising a bypass device located near an exhaust portion of the cooling duct.

2. The heating and cooling system of claim 1, further comprising:

a fan arranged to blow air across at least a portion of said gearbox heat exchanger and at least a portion of said generator heat exchanger.

3. The heating and cooling system of claim 1, wherein the bypass device is chosen from one or more of the group consisting of a door, valve and gate.

4. The heating and cooling system of claim 1, further comprising:

a nacelle warming radiator connected to said cooling duct, wherein said bypass device can be positioned in a first position to direct air out of a nacelle, and positioned in a second position to direct air though said nacelle warming radiator to warm an interior of said nacelle.

5. The heating and cooling system of claim 1, wherein said cooling duct further comprises at least two or more cooling duct sections.

6. The heating and cooling system of claim 5, wherein said at least two or more cooling duct sections, comprise:

a first cooling duct section connected to said gearbox heat exchanger;

a second cooling duct section connected to said generator heat exchanger;

wherein, separate and distinct airflow passes through said first cooling duct section and said second cooling duct section.

7. The heating and cooling system of claim 6, wherein said at least two or more cooling duct sections, further comprise:

a third cooling duct section connected to a control panel heat exchanger;

wherein, separate and distinct airflow passes through said first cooling duct section, said second cooling duct section and said third cooling duct section.

8. A heating and cooling system comprising:

a gearbox;

a gearbox heat exchanger;

a generator;

a generator heat exchanger;

a cooling duct having at least two or more cooling duct sections, the two or more cooling duct sections comprising a first cooling duct section connected to the gearbox heat exchanger and a second cooling duct section connected to the generator heat exchanger; and wherein the cooling duct is configured to transport air across the gearbox heat exchanger and the generator heat exchanger to cool the gearbox and the generator, and wherein separate and distinct airflow passes through the first cooling duct section and the second cooling duct section.

9. The heating and cooling system of claim 8, wherein the at least two or more cooling duct sections, further comprise:

a third cooling duct section connected to a control panel heat exchanger; and wherein, separate and distinct airflow passes through the first cooling duct section, the second cooling duct section and the third cooling duct section.

* * * * *